US012598379B2

(12) United States Patent
Dolzhenko et al.

(10) Patent No.: US 12,598,379 B2
(45) Date of Patent: Apr. 7, 2026

(54) METHODS AND SYSTEMS FOR PROCESSING IMAGE DATA

(71) Applicant: Arm Limited, Cambridge (GB)

(72) Inventors: Vladimir Dolzhenko, London (GB); Maxim Novikov, Manchester (GB)

(73) Assignee: Arm Limited, Cambridge (GB)

( * ) Notice: Subject to any disclaimer, the term of this patent is extended or adjusted under 35 U.S.C. 154(b) by 151 days.

(21) Appl. No.: 18/320,847

(22) Filed: May 19, 2023

(65) Prior Publication Data

US 2024/0388791 A1     Nov. 21, 2024

(51) Int. Cl.
*H04N 23/667* (2023.01)
*H04N 1/00* (2006.01)
*H04N 23/63* (2023.01)
*H04N 101/00* (2006.01)

(52) U.S. Cl.
CPC ....... *H04N 23/667* (2023.01); *H04N 1/00381* (2013.01); *H04N 1/00403* (2013.01); *H04N 23/631* (2023.01); *H04N 2101/00* (2013.01)

(58) Field of Classification Search
CPC ........... H04N 1/00381; H04N 1/00403; H04N 23/62; H04N 23/63; H04N 23/631; H04N 23/632; H04N 23/667; H04N 2101/00
See application file for complete search history.

(56) References Cited

U.S. PATENT DOCUMENTS

2024/0073514 A1 * 2/2024 Peri ........................ G06V 10/44
2024/0259668 A1 * 8/2024 Li ........................... G06V 10/82

* cited by examiner

*Primary Examiner* — Daniel M Pasiewicz
(74) *Attorney, Agent, or Firm* — Berkeley Law & Technology Group, LLP

(57) ABSTRACT

Disclosed herein are a method and apparatus for monitoring for a trigger event, where the trigger event is a determination that a user will issue a capture instruction to capture a target scene, and in response to detecting the trigger event, switching an image system at the apparatus from a first mode of operation, in which image data representing a captured target scene is generated at a first level of quality, to a second mode of operation, in which the image data is generated at a second level of quality, where the second quality level is higher than the first quality.

19 Claims, 5 Drawing Sheets

METHODS AND SYSTEMS FOR PROCESSING IMAGE DATA

The present technology relates generally to methods and systems for processing image data.

Image systems are used to process image frames generated by an image sensor using computer algorithms resulting from the detection of photons from a scene in an environment in which the sensor is located.

It can sometimes be a challenge to manage power consumption on image processing systems when capturing images.

In view of the foregoing considerations, an aspect of the present technology provides a computer-implemented method of controlling an image apparatus for capturing images, the method comprising: monitoring for a trigger event, where the trigger event is a determination that a user will issue a capture instruction to capture a target scene, and in response to detecting the trigger event, switching an image system at the apparatus from a first mode of operation, in which image data representing a captured target scene is generated at a first level of quality, to a second mode of operation, in which the image data is generated at a second level of quality, where the second quality level is higher than the first quality.

In a further aspect there is provided an image system to process image sensor data representative of a captured target scene and output image data for display to a user, where, in response to detecting a trigger event, the image system is to switch from a first mode of operation, in which the image data is generated at a first level of quality, to a second mode of operation, in which the image data is generated at a second level of quality, where the second level of quality is higher than the first level of quality.

In a further aspect there is provided a non-transitory computer-readable medium comprising machine-readable code which, when executed by a processor, causes the processor to perform the computer-implemented method of any of claims 1-16.

Embodiments will now be described, with reference to the accompanying drawings, in which.

Details of systems and methods according to examples will become apparent from the following description with reference to the figures. In this description, for the purposes of explanation, numerous specific details of certain examples are set forth. Reference in the specification to 'an example' or similar language means that a feature, structure, or characteristic described in connection with the example is included in at least that one example but not necessarily in other examples. It should be further noted that certain examples are described schematically with certain features omitted and/or necessarily simplified for the ease of explanation and understanding of the concepts underlying the examples.

Figure 1:
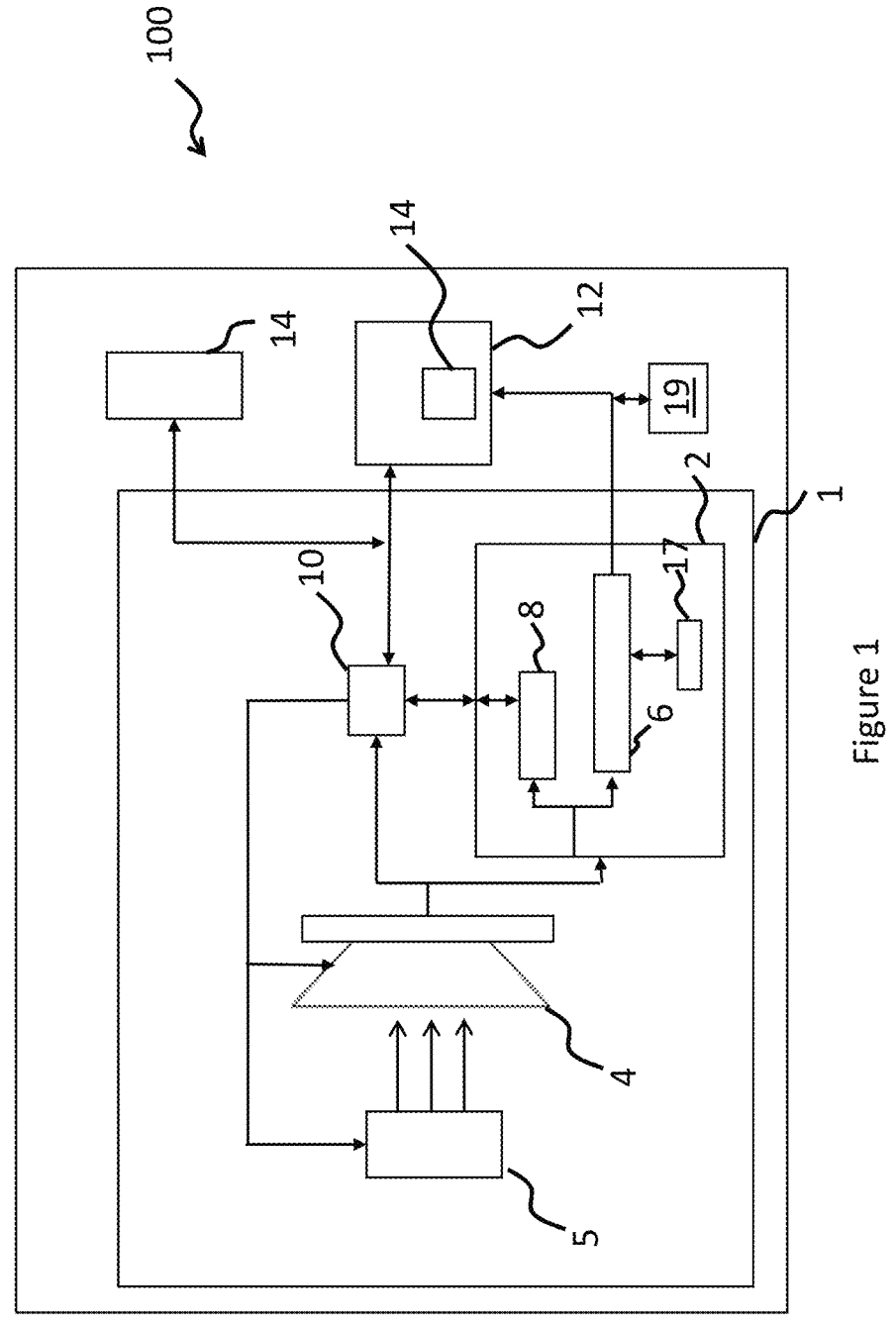
FIG. 1 shows an example of an apparatus to process image data in accordance with an embodiment.

FIG. 1 schematically shows an image apparatus 100 for capturing images, having an image system 1 to capture and process image data, where the image system 1 may comprise hardware/software components to provide image processing functionality.

As an illustrative example, the apparatus 100 may be a mobile phone or tablet where the image system 1 enables a user to capture pictures using a camera application installed thereon. In a further illustrative example, the apparatus 100 may be digital single-lens reflex (e.g., a DSLR) camera although the claims are not limited in this respect. The apparatus 100 may have further hardware/software components to provide additional functionality (e.g., telephony, navigation) although this is not described in detail.

The image system 1 comprises an image signal processor (ISP) 2 and image sensor 4 arranged to generate and output image data representative of a scene captured by the image sensor 4. An optical lens 5 may be provided to guide/focus the light from the scene onto the image sensor 4 via an aperture (not shown).

Image sensor 4 may comprise a plurality of sensor pixels arranged in an array (e.g., in rows and columns). Each sensor pixel may comprise one or more photosensitive elements such as a photodiode that can convert incident light into electronic signals or data. The image sensor 4 may comprise charge-coupled device (CCD) technology or a complementary metal-oxide-semiconductor (CMOS) technology although any suitable photosensitive technology may be used. The array of sensor pixels could comprise, for example, thousands of pixels (e.g., 640×480 pixels), tens of mega-pixels (4096×4096 pixels) and more although the claims are not limited in this respect.

When capturing a scene, e.g., in response to detecting, at a capture input 14, an instruction provided by a user (hereafter "capture instruction") the image sensor 4 generates initial sensor data comprising a plurality of pixel values (initial sensor pixel values), where the plurality of initial sensor pixel values may be arranged in an array (e.g., an array of rows and columns and comprising one or more channels) corresponding to the sensor pixels.

In an illustrative example, such an array of initial sensor pixel values corresponds to an image frame generated or captured by the image sensor 4 and a pixel value in the initial sensor pixel values of the initial sensor data may represent at least one characteristic of the light in the scene captured by a corresponding sensor pixel.

As will be appreciated, such initial sensor data may be a stream of arrays of initial sensor pixel values relating to a stream of frames (e.g., a video), where the arrays of initial sensor pixel values of the initial sensor data may be generated on a per-frame basis.

In general, the initial sensor pixel values of an array of initial sensor data may represent any photometric characteristic that may be used to represent the visual appearance of the corresponding image of the scene captured by the image sensor data.

For example, and as above, an intensity pixel value may represent a luminance of the light captured by the corresponding sensor pixel, which is, for example, a measure of the intensity of light per unit area rather than an absolute intensity. In another example, a brightness value may be representative of a brightness of light captured by the corresponding sensor pixel, which may be proportional to the luminance. In another example the pixel values may be coded with Bayer filter colours. In another example, the arrays of initial sensor data may comprise one or more channels, each channel relating to a different pixel colour.

The size of an array of initial sensor pixel values of the initial sensor data is taken to be the no. of pixels along the length of the array×(multiplied by) the no. of pixels along the width of the array, where the number of pixels values in the array is taken to be the resolution thereof.

Furthermore, the initial sensor data comprising the arrays of initial sensor pixel values may be generated at a frame rate corresponding to the rate at which the image sensor captures the image frames.

The image sensor 4 processes the initial sensor data to generate image sensor data and outputs the image sensor data for processing by the ISP 2. In some embodiments the image sensor data may be stored in storage (e.g., a DRAM) before being provided to the ISP 2 (or accessed by the ISP 2) for processing thereby.

The image sensor data also comprises arrays of image sensor pixel values which correspond to the arrays of initial sensor pixel values of the initial sensor data. Whilst the arrays of image sensor pixel values of the image sensor data may have substantially the same characteristics (e.g. size, resolution, channels etc.) as the arrays of initial sensor pixel values of the initial sensor data, the image sensor 4 may process the initial sensor data to modify it in some manner as required for a particular application of the ISP 2 and/or to place the image sensor data into a format suitable for processing by the ISP 2.

The image sensor 4 may output the image sensor data in any suitable format. For example, the image sensor 4 may output the image sensor data in Bayer format, which is associated with arrangement of an array of colour filters of Red, Green, and Blue (RGB) on the photosensitive area although the claims are not limited in this respect. In a further example the image sensor data may be output in monochrome. In a further example the image sensor 4 may reduce the size and/or resolution of the image sensor data in comparison to the initial sensor data.

The image sensor data may be modified (e.g., reduced in size or resolution), by the image sensor (e.g., before being output therefrom) or may be modified by a processor component on the apparatus (e.g., by accessing the image sensor data in storage). Such modification may to reduce the quality (e.g., frame rate, resolution, size) of the image sensor data (e.g., by binning, cropping, filtering, compressing or otherwise).

The ISP 2 includes a pipeline 6 of one or more image processing blocks 6 comprising circuitry to process the received image sensor data in accordance with one or more algorithms, whereby these algorithms are used to generate data in a suitable format for the consumer component 12. For example, the one or more image processing blocks 6 may provide, for example, noise reduction functionality (denoising functionality), colour filter array interpolation functionality (demosaicing functionality), colour management functionality, or tone-mapping functionality.

Some image-processing and camera-control functions (e.g., algorithm control, image sensor control, lens control) require further information obtained from statistics data generated by one or more statistics data modules 8.

The one or more statistics data modules 8 receive image sensor data as an input, and using one or more algorithms, generate statistics data of one or more types derived, at least in part, from the image sensor data (e.g., by applying the one or more algorithms to an array of pixel values in the image sensor data). Examples of different types of statistics data generated by the one or more statistics data modules 8 include: Auto-Exposure (AE) statistics data; Auto-Focus (AF) statistics data; and Auto-White-Balance (AWB) statistics data. It will be appreciated that the types of statistics data described above are exemplary only and any suitable statistics data may be used.

The one or more image processing blocks 6 may process the image sensor data to generate ISP image data (e.g., an image or streams of images of the RGB space domain) which is provided to a consumer component 12. The consumer component 12 in the present example comprises a display (e.g., an OLED or LCD display), although the claims are not limited in this respect. Additionally, or alternatively, the ISP image data may be stored in storage to be accessed later.

Firmware to control the one or more image processing blocks 6 in accordance with the one or more algorithms may run on a processor component 10 within the image system 1 (or within the apparatus 100). For example, the processor component 10 may be a compute device such as a central processing unit (CPU), microcontroller (MCU), neural processing unit (NPU), an application-specific integrated circuit (ASIC) or any suitable compute device.

The processor component 10 may also control other hardware/software components of the image system 1 such as, for example, the functionality of the one or more processing blocks 6 e.g. to adjust the quality of the ISP image data; the functionality of the optical lens 5 (e.g. by controlling the focal length (f) to focus the light onto the sensor) and the aperture between the lens and image sensor 4 (e.g. by modifying the size of the aperture in response to outputs from the one or more image processing blocks or one or more statistics data modules 8). The derived statistics data may also be used by the processor component 10 to adjust or select the algorithms to be used by the one or more processing blocks 6 in order to obtain a desired image quality when used (e.g., displayed/stored) at a consumer component 12. For example, it may be desirable to run an auto-exposure algorithm to maintain the sensor's gain and exposure time at appropriate values to obtain a particular quality of ISP image data.

The ISP 2 may comprise fixed-function hardware components with a pipelined architecture although the claims are not limited in this respect and may comprise other hardware and/or software components in addition to the fixed-function hardware components.

One or more of the features of the image system 1 (e.g., the image sensor 4, the ISP 2; the processor component 10 and/or communication circuitry etc.) may be embedded in the same System on Chip (SoC). Furthermore, although depicted external to the image system 1 on apparatus 100 in FIG. 1, the consumer component 12 may be part of the image system 1.

In operation, a user provides a capture instruction to trigger capture input 14, which may comprise interacting with a physical capture input on the apparatus (e.g., pressing/tapping a physical button) or interacting with a virtual capture input (e.g., pressing/tapping a virtual button) on a user interface of the apparatus (e.g., the display 12) or providing inputs via one or more sensors (e.g., via a microphone or camera). On detecting capture instruction, the image sensor 4 generates and provides image sensor data to ISP 2 for processing and generation of ISP image data.

A user of a camera application (e.g., on a mobile phone or digital camera) will typically desire high quality images (e.g., high resolution images, high frame rate). However, generating image sensor data having a high frame rate/high resolution at the image sensor and processing such image sensor data at the ISP 2 and then rendering/storing such a high quality output image can impact the resources of the apparatus (e.g., power/processing/storage resources). For example, some applications often require the image sensor to capture multiple frames and output the multiple frames to the ISP 2 for processing to increase the sensitivity and dynamic range of the subsequently rendered image (e.g., by fusing the images using one or more algorithms).

Furthermore, a user will generally view an output image of a target scene on a consumer component 12, such as a display, before providing the capture instruction to cause the image sensor 4 to capture the target scene. Continuously rendering the output image of the target scene on the display in relatively high quality can be burdensome on the resources of the apparatus (e.g. power/processing/storage).

To reduce the burden on the apparatus' resources, the image system 1 may operate in a relatively low-power mode of operation (hereafter "preview mode" of operation) when the user is viewing the output image of the target scene on the display 12, such that the output image of the target scene rendered on the display 12 has a reduced level of quality in comparison to a relatively high-power mode (hereafter "capture mode"), when the user triggers the capture input 14 by providing the capture instruction to cause the image sensor 4 to capture the target scene and render the output image on the display 12.

As an illustrative example, during the preview mode, one or more components of the image system 1 may operate differently (e.g., with reduced functionality) in comparison to the capture mode.

For example, the image sensor data generated by the image sensor 4 in preview mode may be reduced in resolution or frame rate in comparison to image sensor data generated by the image sensor 4 in capture mode. For example, in both preview and capture mode the initial sensor data may be relatively large in size/resolution (e.g., an array comprising 2 k×2 k initial sensor pixel values), whereas, in preview mode, the image sensor 4 may reduce the size and/or resolution of the initial sensor data (e.g., by way of binning, cropping, sampling processes) before outputting the modified initial sensor data as image sensor data.

As a further illustrative example, in preview mode the image sensor 4 may be controlled to operate at a relatively low frame rate (e.g., <30 fps) compared to capture mode in which the image sensor may operate at a higher frame rate (e.g., >30 fps up to e.g., 60 fps).

As a further example, different algorithms may be used by the ISP 2 to process the image sensor data when operating in capture mode in comparison to operating in preview mode.

As a further example, the ISP image data from the ISP may be generated at a reduced resolution in preview mode in comparison to the ISP image data generated in capture mode.

Furthermore, components of the apparatus 100 separate from the image system may also operate differently when the image system operates in preview mode in comparison to the capture mode. For example, the brightness of the display 12 may be reduced in preview mode in comparison to capture mode.

Whilst predominantly operating in preview mode may reduce the burden on the apparatus' resources, switching from the preview mode to capture mode in response to a capture input 14 may result in a perceptible delay or lag between the user triggering the capture input 14 to capture the target scene and the image system 1 capturing, processing, and rendering the captured target scene on the display 12. Such a delay may be in the range of milliseconds (ms.) to seconds(s) and, although relatively short, may be undesired as it may cause a user to miss a transient or short lived event in the target scene at the particular moment in time which the user attempted to capture (e.g. a shooting star; a football crossing a goal line, a person, car or horse passing a race finishing line etc.).

Techniques to mitigate or reduce the delay or lag include operating the image system 1 in capture mode only, such that there is no switch from preview mode to capture mode when the user triggers the capture input. However, as above, operating in capture mode may be relatively burdensome on the apparatus' resources. A further technique may include storing the high resolution image sensor data from the image sensor 4 in storage (e.g., DRAM), downscaling the image sensor data to a lower resolution and processing the lower resolution image using the ISP 2. However, such an approach may result in heating of the sensor, high power consumption and shorter battery life in comparison to when operating in preview mode.

In embodiments, to reduce the delay, there are described techniques to, when the image system is operating in preview mode, detect a trigger event and, in response to detecting the trigger event, switch the image system 1 to operate in a capture ready or capture mode (hereafter "capture mode"), where the image system prepares to receive a capture instruction, and to remain in capture mode until at least one capture input is detected or until it is determined that the image system 1 should return to operate in preview mode (e.g. after a set time elapses, or a user instruction is detected).

In the present illustrative embodiments, a trigger event is a determination, by the apparatus 100 (e.g., using the processor 10 or another processing element of the image system 1) that a user will issue a capture instruction. In embodiments, the user may not actually issue the capture instruction after the trigger event is detected.

As an illustrative example, the trigger event may be a determination of a confidence score indicative of whether or not the user will issue a capture instruction and trigger the capture input. This may include determining the likelihood the user will trigger the capture input to be above a threshold level. Additionally, or alternatively the determination may be based on or in response to detecting a key word or phrase indicative of the user's intention. In a further example, the trigger event may be detecting, e.g., using an accelerometer at the apparatus (e.g., part of the image system 1), that the user picked up the apparatus or is orientating the apparatus in a particular manner.

For example, the trigger event may be detecting, using a sensor (e.g. capacitive or resistive sensor), the user touching a particular area of the apparatus (e.g. the capture input 14), or detecting a user action (e.g. a finger) in proximity (e.g. within a particular distance) of the capture input 14, or the trigger event may be detecting a noise (e.g. the user's voice "I want to take a picture"), or the trigger event may be detecting a gesture by the user (e.g. a wave, or smile etc.).

In embodiments, and as described below, the capture input 14 may be a physical input on the apparatus (e.g., a physical button); a virtual button on the apparatus (e.g., a button rendered on the display 12); a speaker (e.g., to detect a vocal instruction (e.g., keyword, phrase, or noise)); a camera (e.g., to detect a defined gesture).

Figures 2A, 2B, 2C, 2D:
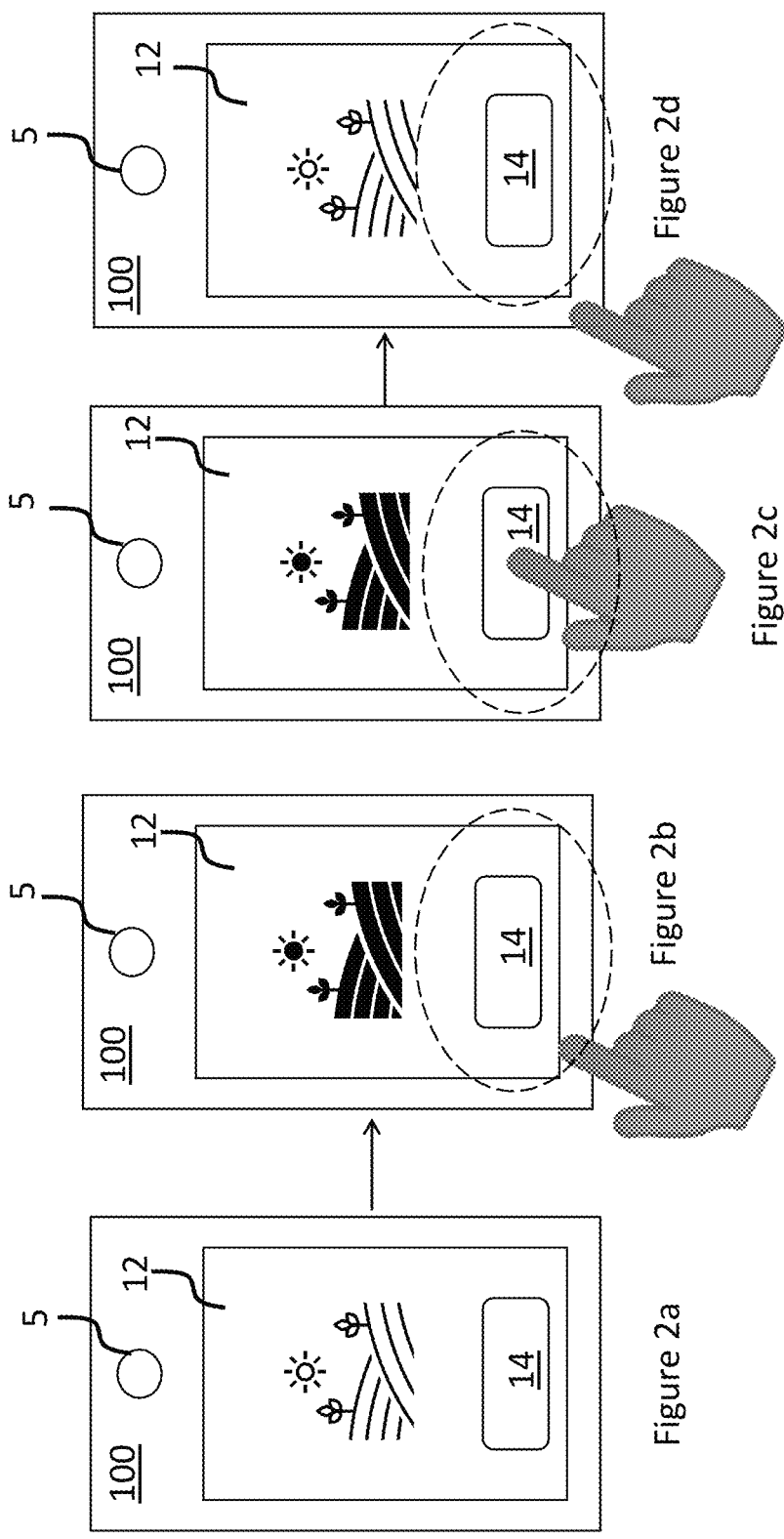
FIGS. 2a-2d show schematically a user operating an apparatus to process image data according to an embodiment.

In accordance with an embodiment, FIGS. 2a-2d illustratively show examples of apparatus 100 having an image system arranged to capture a scene as described above in FIG. 1 and configured to operate in a preview mode (FIGS. 2a & 2d) and capture mode (FIGS. 2b & 2c).

In FIG. 2*a*, image sensor data captured by the image sensor representative of the target scene is processed by the ISP and the resulting ISP image data is rendered as one or more output images on display 12 (e.g., for viewing by a user), where the apparatus operates in a preview mode.

In FIG. 2*b*, the apparatus monitors for a trigger event, which in the present illustrative example comprises a user action within a defined or threshold proximity of the capture input 14 (as indicated by the dashed oval shape). In the illustrative example of FIG. 2*b*, the user action detected comprises a user's finger within proximity of the capture input. As above, the capture input (or other part of the apparatus) may comprise a capacitive sensor, whereby the detected capacitance varies dependent on the distance of the user's finger therefrom.

In response to detecting the trigger event, the apparatus is switched to operate in capture mode. In capture mode the rendered output image(s) of the captured scene may be displayed to the user at an increased quality (e.g., an increased frame rate, size and/or resolution) in comparison to that displayed to the user during the preview mode. Additionally, or alternatively the image sensor data may be processed differently in capture mode in comparison to preview mode in anticipation of the user issuing a capture instruction.

In FIG. 2*c*, the user provides a capture instruction via the capture input 14 to capture the target scene shown on the display 12 (or viewed via a viewfinder) at the particular moment in time the user issued the capture instruction. The ISP image data corresponding to the captured target scene may be rendered as one or more output images and displayed to the user (e.g., at a higher level of quality comparted to preview mode) and/or stored in storage (e.g., non-volatile storage) on the apparatus.

In FIG. 2*d*, the trigger event is no longer detected as the user's finger is determined to have moved outside of the threshold proximity of the capture input 14 and the apparatus switches from capture mode to preview mode.

Whilst the illustrative example of FIGS. 2*a*-2*d* depicts the user interacting with an input button (capture input 14) via the UI on the display 12 to provide instructions to capture a scene, the claims are not limited to the user physically interacting with an input button.

For example, the capture input 14 may be provided by a user input detected by a microphone (e.g., key-word; -phrase or -noise (e.g., "take picture")), camera (e.g., predefined gesture) or other sensor device.

It will also be appreciated that the trigger event is not limited to detecting a user's finger within a threshold proximity, but may in additional, or alternative embodiments, comprise detecting, via a microphone on the apparatus, a key-word, -phrase or -noise spoken by the user (e.g., "I want to take a picture"). Additionally, or alternatively, the trigger event may comprise detecting, using a camera, a defined gesture by the user (e.g., a handwave or specific no. of fingers). In a further example, the trigger event may be detecting, e.g., using an accelerometer at the apparatus 100 (e.g., part of the image system 1), that the user picked up the apparatus or is orientating the apparatus 100 in a particular manner.

As an illustrative example, and as depicted in the FIGS. 3*a*-3*d*, the capture input 14 comprises a microphone 16.

Figures 3A, 3B, 3C, 3D:
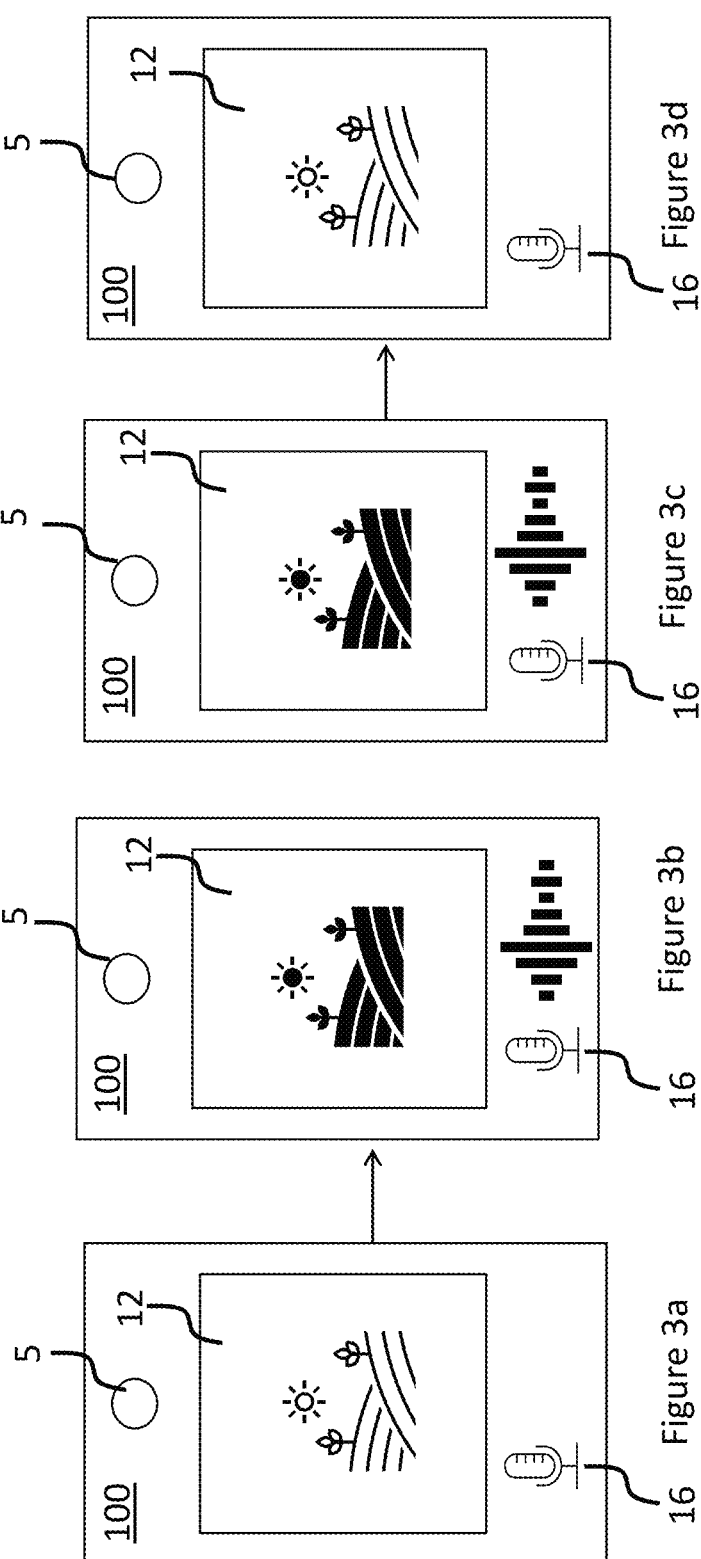
FIGS. 3a-3d show schematically a user operating an apparatus to process image data according to an embodiment.

In FIG. 3*a*, image sensor data captured by the image sensor representative of the target scene is processed by the ISP and the resulting ISP image data is rendered as one or more output images on display 12 (e.g., for viewing by a user), where the apparatus 100 operates in a preview mode.

In FIG. 3*b*, a trigger event is detected, which in the present illustrative example comprises a detecting, via a microphone 16 on the apparatus 100, a key-word, -phrase or -noise spoken by the user (e.g., "I want to take a picture", "3, 2, 1," etc.).

In response to detecting the trigger event, the apparatus 100 is switched to operate in capture mode. In capture mode the rendered output image of the captured scene may be displayed to the user at an increased quality (e.g., an increased frame rate, size and/or resolution) in comparison to that displayed to the user during the preview mode. Additionally, or alternatively the image sensor data may be processed differently in capture mode in comparison to preview mode in anticipation of the user issuing a capture instruction.

In FIG. 3*c*, the user, provides a capture instruction via the capture input 14 to capture the target scene shown on the display 12 (or viewed via a viewfinder) at the particular moment in time the user issued the capture instruction. The ISP image data corresponding to the target scene is displayed to the user and/or stored in storage (e.g., non-volatile storage) on the apparatus.

The user may use the microphone 16 to issue the capture instruction, for example by using a key-word, -phrase, or -noise (e.g., "take picture"), or the user may use another capture input 14 type to capture the scene, such as a physical button, a virtual button, via use of a gesture, etc.

In FIG. 3*d*, the image system 1 switches from capture mode to preview mode, for example, after a certain amount of time has elapsed without the user triggering the capture input 14 or in response to one or more words, phrases or noises made by the user (e.g., "Finished", "No more pictures").

Whilst the illustrative example of FIGS. 3*a*-3*d* depicts detecting the trigger event via a microphone 16, the claims are not limited in this respect and the trigger event may be detected by any suitable method.

When in preview mode (as described, for example, at FIGS. 2*a* & 3*a*) and looking again at FIG. 1, the image system 2*a* processes image sensor data relating to a target scene to generate ISP image data and to render the ISP image data as one or more output images (e.g. a stream of images) relating to the target scene on the display, the one or more images of the target scene having a first level of quality.

As above, when a trigger event is detected, the apparatus 100 is switched to operate in capture mode in anticipation of receiving a capture instruction from the user such that when operating in capture mode (as described, for example, at FIGS. 2*c* & 3*c*) the apparatus may operate differently compared to when operating in preview mode. For example, the apparatus may perform different processing operations on the image sensor data and/or ISP image data in capture mode as compared to the processing operations on the image sensor data and/or ISP image data in preview mode.

As an illustrative example, in preview mode the image sensor data may be passed from the image sensor 4 to the ISP 2 for processing to allow the ISP 2 generate ISP image data and display output image(s) of the target scene on the display 12. Such processing may be performed by a first set of one or more processing blocks in ISP pipeline 6 using one or more algorithms.

In capture mode, the image sensor data may also be passed from the image sensor 4 to the ISP 2 for processing to allow the ISP 2 generate ISP image data and display output image(s) of the target scene on the display 12, where the output images rendered on the display are at the same or a higher level of quality in capture mode compared to preview mode.

Additional components (e.g., hardware/software) may be used when the apparatus is operating in preview mode compared to capture mode. For example, different parts of the ISP pipeline may be enabled when in capture mode or different algorithms or statistics data may be used to process the image sensor data when in capture mode.

In addition to processing the image sensor data to output images representative of the target scene at the display, the image system 2 can, when in capture mode, prepare for the user issuing a capture instruction to capture a target scene at a particular moment in time.

As an illustrative example, the image system 2 may perform pre-processing on the image sensor data and store the pre-processed image sensor data in storage 17 (e.g., volatile storage) at the image system (e.g., ISP cache, image system cache). For example, multiple images of the image sensor data relating to the target scene may be aligned and/or stitched together to produce higher resolution/dynamic range image. As a further example the image system may perform pre-processing on the image sensor data to reduce noise, perform defect pixel correction, adjust white balance, perform shading correction and/or any suitable processing as may be required by the particular output image settings defined by a user.

The pre-processing may be performed using a second set of one or more processing blocks, and additional or alternative algorithms to those used by the first set of processing block(s) (e.g., where processing blocks are enabled in capture mode compared to preview mode).

When a capture instruction to capture a target scene at a particular moment in time is subsequently received from a user, the image system 1 can retrieve the pre-processed image sensor data relating to the captured target scene from the storage 17, and complete processing for the pre-processed image sensor data to generate ISP image data relating to the captured target scene which may be rendered as one or more output images at the display 12 or stored in storage 19 (e.g. non-volatile storage). The image system 1 may complete the processing of the pre-processed image data to generate the ISP image data using a third set of one or more processing blocks, and additional or alternative algorithms used to pre-process the image sensor data (e.g., where further processing blocks are enabled in capture mode compared to preview mode).

Such functionality means that the user can continue to view the target scene (e.g., at a first level of quality) on the display 12, but where the ISP image data corresponding to the captured target scene can be generated at higher level of quality for storage or for rendering the output image of the captured scene in higher quality on the display 12 should the user require. Thus, in capture mode, the ISP image data used to render a target scene on the display before the user issues the capture instruction can have a relatively low quality (e.g., resolution), but the ISP image data corresponding to the captured target scene can have a relatively high quality and may be stored in storage 19 for later retrieval by the user.

As described above, different HW and/or SW components may be used in preview mode in comparison to capture mode. For example, although only one image sensor is depicted in the image system of FIG. 1, the image system may comprise two or more image sensors, where each image sensor may provide different functionality. For example, a first image sensor may be used to generate and output first image sensor data in capture mode whereas a second image sensor may be used to generate and output second image sensor data when operating in preview mode, where the first image sensor data output may have different characteristics to the second image sensor data (e.g., higher size, higher resolution, or increased no. of channels etc.)

Additionally, or alternatively, the image sensor data may be processed differently in preview mode in comparison to capture mode. A further illustrative example of such functionality is depicted in image apparatus 200 of FIG. 4.

Figure 4:
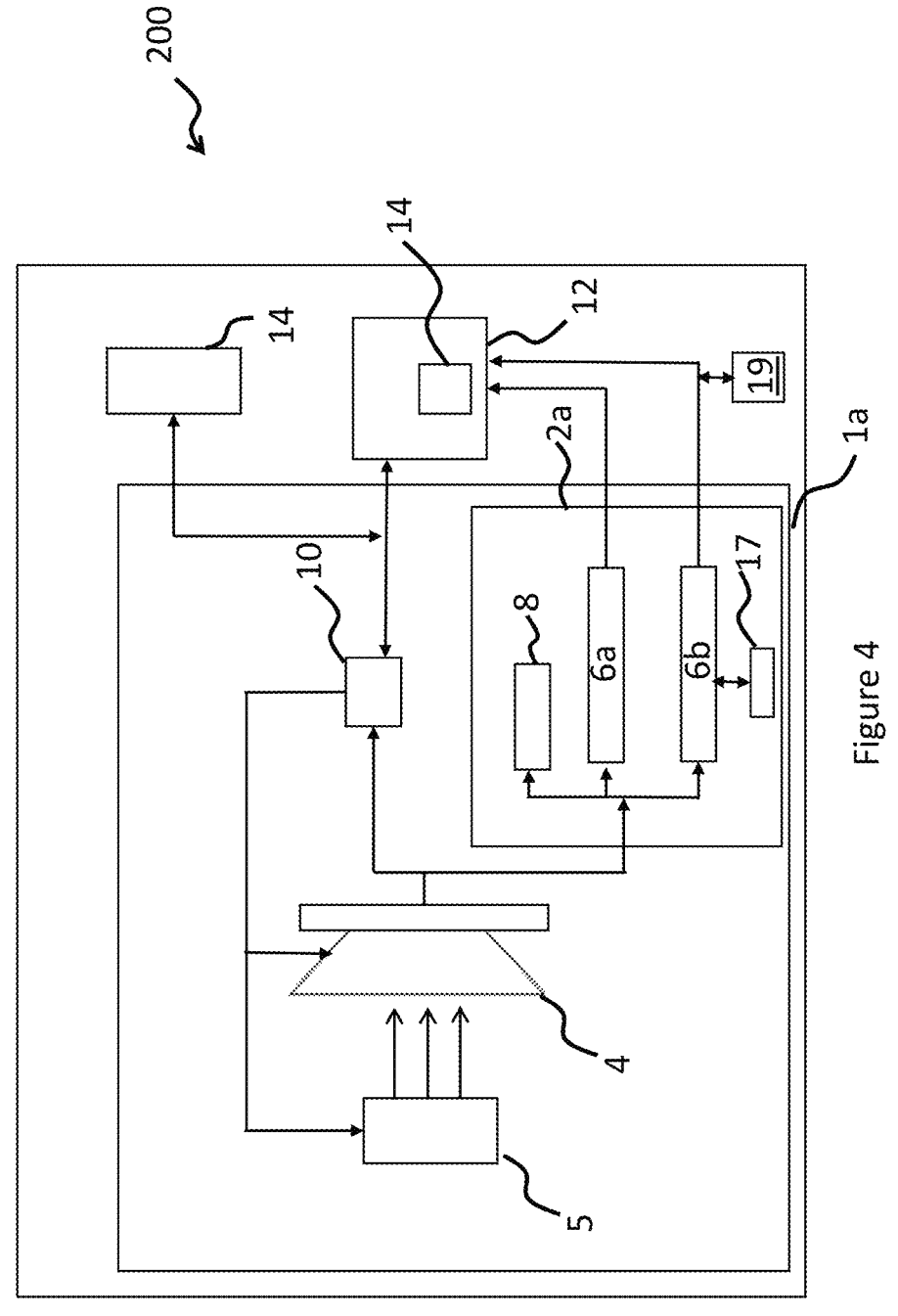
FIG. 4 shows an example of an apparatus to process image data in accordance with an embodiment.

Like features described above in FIG. 1 will use the same feature numbers in FIG. 4.

Image system 1a functions in a similar manner to the image system 1 of FIG. 1 above. However, the ISP 2a of FIG. 4 comprises two pipelines 6a, 6b each comprising one or more image processing blocks to process the image sensor data to generate ISP image data representative of a target scene, which is rendered as one or more output images on a display 12.

In the illustrative example of FIG. 4, the first pipeline 6a is used to process image sensor data when the apparatus is in preview mode and capture mode to generate ISP image data rendered as one or more output images showing the target scene on the display. The second pipeline 6b comprises one or more processing blocks and is used to provide additional processing functionality and is enabled when the apparatus is in capture mode.

The quality of the image sensor data provided to the first pipeline 6a may be reduced in quality (e.g., size, resolution, frame rate) in comparison to the image sensor data provided to the second pipeline 6b.

Additionally, or alternatively, the quality of the ISP image data generated by the first pipeline 6a may be reduced in quality (e.g., size, resolution, frame rate) in comparison to the ISP image data generated by the second pipeline 6b. For example, the first and second ISP pipelines may have different processor blocks and/or may use different algorithms which may affect the quality of the ISP image data.

Furthermore, the second ISP pipeline 6b may be used to pre-process the image sensor data when in capture mode, and to store the pre-processed image sensor data in volatile storage 17 such that when a user issues a capture instruction to capture a target scene, the second pipeline 6b can retrieve the pre-processed image sensor data corresponding to the captured target scene, and complete processing, and output ISP image data for rendering as one or more output images of the captured target scene or storing the ISP image data in non-volatile storage 19. The ISP image data may be generated in a different file format depending on the requirements of the user or application (e.g., RAW, JPEG, TIFF, PNG etc.). Thus, different compression algorithms may be applied to the image data to reduce the file size thereof (e.g., in post-processing operations). Thus, the burden on the resources of the image system may be reduced when operating in preview mode in comparison to when operating in capture mode. Furthermore, given the image sensor data undergoes pre-processing (for example, aligned and/or stitching) in anticipation of the user issuing the capture instruction, the ISP pipeline 6 does not have perform these operations after the capture instruction is issued, thereby reducing the time it takes to complete processing the image sensor data after the capture instruction is received.

Furthermore, the ISP image data may also be accessed e.g., by one or more HW or SW components at the apparatus and undergo post-processing thereon (e.g., to change the file format; alignment; blurring; resizing etc.)

For example, a CPU or other processor component remote from the ISP may access the ISP image data in the non-volatile memory and perform post-processing thereon (e.g., to change the file format; alignment; blurring; resizing etc.) and save the post-processed image data in further storage for later retrieval by the user. Such functionality reduces the processing/power burden at the image system. Furthermore, the CPU may process the ISP image data in accordance with further algorithm(s) not available to the ISP.

One or more of the features of the image systems 1, 1a (e.g., the image sensor 4, the ISP 2, 2a; the processor component 10 and/or communication circuitry etc.) may be embedded in the same System on Chip (SoC). Furthermore, although depicted external to the image system 1, 1a on apparatus 100 in FIG. 1 and apparatus 200 in FIG. 4, the consumer component 12 may be part of the image system 1, 1a.

Figure 5:
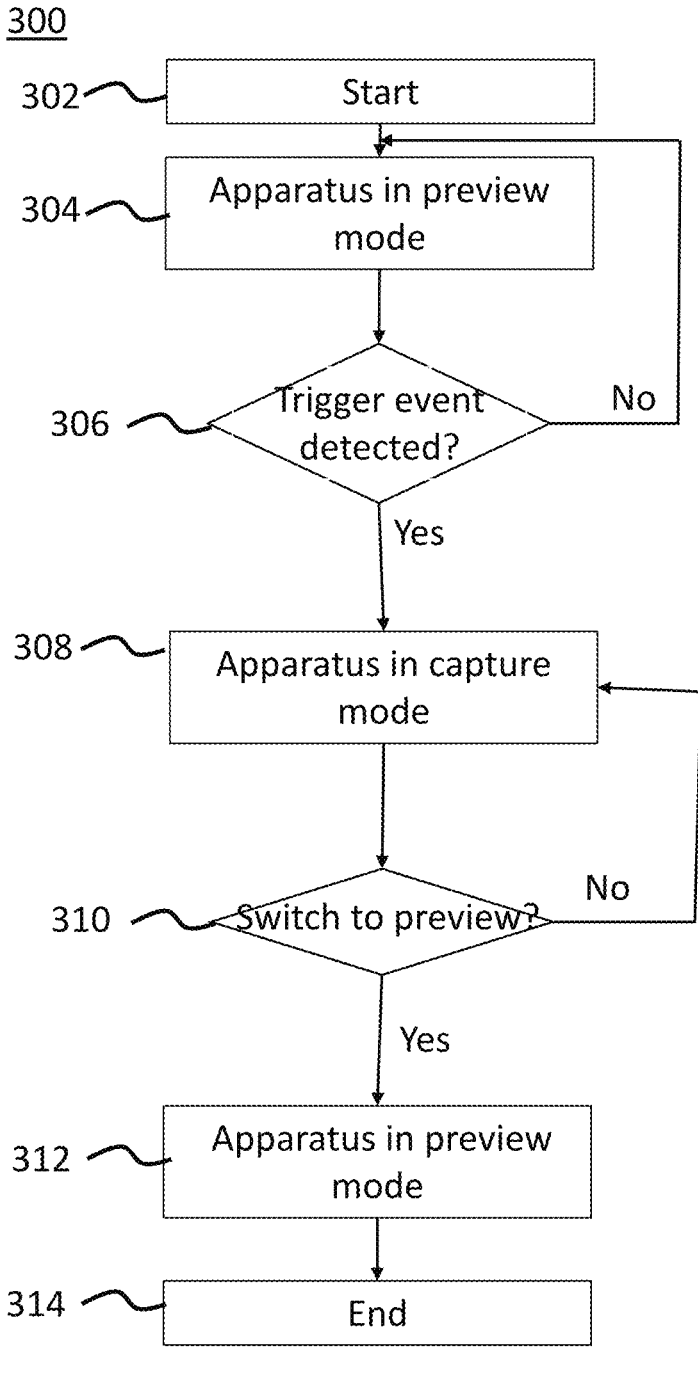
FIG. 5 shows an exemplary method of operating an image system in accordance with an embodiment.

FIG. 5 shows an exemplary method of detecting a trigger event at an apparatus, such as apparatus comprising an image system, in accordance with an embodiment.

At S302 the method 300 starts.

At S304 the apparatus operates in preview mode, where a target scene captured by an image sensor at the apparatus is rendered on a display, such as display 12, at a first level of quality (e.g., frame rate, resolution, size etc.).

At S306, the apparatus monitors for a trigger event and when a trigger event is detected the image system is, at S308, switched to operate in capture mode, otherwise the image system continues to operate in preview mode (S304).

As an illustrative example, the trigger event may be a determination of a confidence score indicative of whether or not the user is likely to issue a capture instruction and trigger a capture input of apparatus. This may include determining the likelihood the user will trigger the capture input to be above a threshold score or level. Additionally, or alternatively, the determination may be based on or in response to detecting a key word or phrase indicative of the user's intention. In a further example, the trigger event may be detecting, e.g., using an accelerometer at the apparatus (e.g., part of the image system), that the user picked up the apparatus or is orientating the apparatus in a particular manner.

At S310, it is determined whether the image system should continue to operate in capture mode S308 or, as at S312, switch back to preview mode. For example, the apparatus may switch from capture mode to preview mode after a certain amount of time has elapsed without the user triggering the capture input or in response to one or more words, phrases or noises made by the user (e.g., "Finished," "No more pictures." Additionally, or alternatively, the trigger event may be detecting, e.g., using an accelerometer at the apparatus (e.g., part of the image system 1), that the apparatus is stationary (e.g., indicative that the user is no longer holding the apparatus) or is located in a user's pocket or bag.

The method 300 ends as at S314.

As described above, the apparatus may have different modes of operation, where the apparatus and/or the hardware/software components thereof (e.g., the image system) may operate differently in each mode of operation, and where each mode of operation may affect the resources (e.g., power/processing/storage resources) of the apparatus differently.

Furthermore the level of quality (e.g. resolution, size and/or frame rate) of one or more images rendered on a display and/or stored in storage when the image system is set to operate in a first mode of operation (e.g. preview mode) may be reduced in comparison to the quality of images rendered on the display and/or stored in storage when the image system is set to operate in a second mode of operation (e.g. capture mode).

As an illustrative example, on detecting the trigger event, the processor component (or another processor component) may cause the apparatus to switch from operating in the first mode of operation to the second mode of operation.

In capture mode the image sensor may increase the resolution of the image sensor data; increase the frame rate at which frames are captured thereby; increase the resolution of the image sensor data output to the ISP; and correspondingly increase the speed at which image sensor data is provided to the ISP.

Switching from preview mode to capture mode may result in the ISP processor blocks processing the image sensor data in a different manner compared to preview mode. As an illustrative example, the ISP processor blocks may use different algorithms in preview mode in comparison to capture mode, where the image sensor data is processed using a first algorithm(s) when the apparatus is operating in preview mode the image sensor data is processed using a second algorithm(s) when the apparatus is operating in capture mode.

Additionally, or alternatively, switching from preview mode to capture mode may re-enable parts of the ISP pipeline that were disabled (e.g., bypassed or deactivated) in preview mode such as one or more ISP processor blocks to process the image sensor data in a different manner compared to preview mode.

Additionally, or alternatively, the image system may pre-process image sensor data in anticipation of a user issuing a capture instruction such that the amount of processing required, and time taken to complete processing of the image sensor data and generate ISP image data may be reduced.

As a further illustrative example, the brightness of the display may be reduced in preview mode in comparison to capture mode.

As will be appreciated by one skilled in the art, the present techniques may be embodied as a system, method, or computer program product. Accordingly, the present techniques may take the form of an entirely hardware embodiment, an entirely software embodiment, or an embodiment combining software and hardware.

Furthermore, the present techniques may take the form of a computer program product embodied in a computer readable medium having computer readable program code embodied thereon. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object-oriented programming languages and conventional procedural programming languages.

For example, program code for carrying out operations of the present techniques may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog or VHDL (Very high-speed integrated circuit Hardware Description Language).

The program code may execute entirely on the user's computer, partly on the user's computer and partly on a remote computer or entirely on the remote computer or server. In the latter scenario, the remote computer may be connected to the user's computer through any type of network. Code components may be embodied as procedures, methods, or the like, and may comprise sub-components which may take the form of instructions or sequences of instructions at any of the levels of abstraction, from the direct machine instructions of a native instruction set to high-level compiled or interpreted language constructs.

It will also be clear to one of skill in the art that all or part of a logical method according to the preferred embodiments of the present techniques may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

The examples and conditional language recited herein are intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its scope as defined by the appended claims.

Furthermore, as an aid to understanding, the above description may describe relatively simplified implementations of the present technology. As persons skilled in the art would understand, various implementations of the present technology may be of greater complexity.

In some cases, what are believed to be helpful examples of modifications to the present technology may also be set forth. This is done merely as an aid to understanding, and, again, not to limit the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional elements labeled as a "block," "module," "component" or "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

It will be clear to one skilled in the art that many improvements and modifications can be made to the foregoing exemplary embodiments without departing from the scope of the present techniques.

What is claimed is:

1. A computer-implemented method of controlling an image apparatus for capturing images, the method comprising:

monitoring for a trigger event, wherein the trigger event is a determination that a user will issue a user issued capture instruction to capture a target scene; and in response to detecting the trigger event, switching an image system at the image apparatus from a first mode of operation, in which image data representing a captured target scene is generated at a first level of quality, to a second mode of operation, in which the image data is generated at a second level of quality, wherein the second level of quality is higher than the first level of quality, wherein operating in the second mode of operation comprises:

in advance of receiving the user issued capture instruction, performing one or more pre-processing operations on image sensor data representative of the target scene to provide pre-processed image sensor data; and in response to receiving the user issued capture instruction, performing one or more further processing operations on the pre-processed image sensor data to generate, at an image sensor, image sensor data representative of the captured target scene.

2. The method of claim 1, wherein the first and second levels of quality comprise a lower and a higher level of image resolution.

3. The method of claim 1 wherein the first and second levels of quality comprise a lower and a higher image size.

4. The method of claim 1, wherein the first and second levels of quality comprise a lower and a higher frame rate.

5. The method of claim 1, further comprising:

processing, at an image processor component using one or more algorithms, the image sensor data representative of the target scene to generate image data for display or storage, wherein the image sensor data representative of the target scene comprises a plurality of pixel values representative of the target scene.

6. The method of claim 5, further comprising:

processing the image sensor data representative of the target scene using a first algorithm when the image apparatus is operating in the first mode of operation; and processing the image sensor data representative of the target scene using a second algorithm when the image apparatus is operating in the second mode of operation.

7. The method of claim 5, wherein:

the image processor component comprises a processor pipeline to process the image sensor data representative of the target scene; and the method further comprises:

disabling, in the first mode of operation, at least a portion of the processor pipeline; and enabling, in the second mode of operation, the disabled at least a portion of the processor pipeline.

8. The method of claim 1, further comprising, determining whether operation of the image apparatus is to continue in the second mode of operation and switching the image apparatus to operate in the first mode of operation in accordance with the determination.

9. The method of claim 8, wherein determining whether operation of the image apparatus is to continue in the second mode of operation comprises:

determining that the trigger event is no longer detected.

10. The method of claim 9, wherein determining that the image apparatus should switch from the second mode of operation to the first mode of operation comprises:

determining that a specified time has elapsed since detecting the trigger event.

11. The method of claim 1, wherein determining whether the trigger event has occurred comprises detecting, at a physical input, a virtual input or one or more sensors, a user action or input.

12. The method of claim 11, wherein the user action or input comprises one or more of:

detecting a key word or phrase; detecting a user gesture; detecting a specific movement of the image apparatus; and detecting a user action within a defined proximity of the image apparatus.

13. The method of claim 1, wherein detecting the trigger event has occurred comprises: determining that a confidence score indicative of whether or not the user will issue the capture instruction is above a threshold score or level.

14. The method of claim 1, further comprising: rendering, in the second mode of operation, the image data on a display at a higher level of quality in comparison to the image data rendered on the display in the first mode of operation.

15. The method of claim 1, further comprising: storing, in the second mode of operation, the image data in storage at a higher level of quality in comparison to the image data generated in the first mode of operation.

16. An image system to process image sensor data representative of a captured target scene and output image data for display to a user, wherein:

in response to detection of a trigger event, the image system is to switch from a first mode of operation, in which image data is generated at a first level of quality, to a second mode of operation, in which the image data is generated at a second level of quality, wherein the second level of quality is higher than the first level of quality and wherein the trigger event is a determination that a user will issue a user issued capture instruction to capture a target scene, wherein operation in the second mode of operation comprises:

in advance of receipt of the user issued capture instruction to capture a target scene, the image system is to perform one or more pre-processing operations on image sensor data representative of the target scene to provide pre-processed image sensor data; and responsive to receipt of the user issued capture instruction to capture a target scene, the image system is to perform one or more further processing operations on the pre-processed image sensor data to generate image sensor data representative of the captured target scene.

17. The image system of claim 16, wherein:

the image system comprises an image sensor to generate the image sensor data representative of the target scene comprising one or more arrays of initial sensor pixel values representative of a visual appearance of the target scene; and a size, frame rate or resolution of the image sensor data representative of the target scene, or a combination thereof, is lower in the first mode of operation in comparison to the second mode of operation.

18. The image system of claim 17, wherein:

the image system comprises a processor component to process the image sensor data representative of the target scene and generate the image data; and a size, frame rate or resolution of the image data, or a combination thereof, is lower in the first mode of operation in comparison to the second mode of operation.

19. A non-transitory computer-readable medium comprising machine-readable code which, when executed by a processor, causes the processor to:

monitor for a trigger event, wherein the trigger event is a determination that a user will issue a user issued capture instruction to capture a target scene;

responsive to detection of the trigger event, switch an image system at an apparatus for capturing images from a first mode of operation, in which image data representing a captured target scene is generated at a first level of quality, to a second mode of operation, in which the image data is generated at a second level of quality, wherein the second level of quality is higher than the first level of quality, wherein operation in the second mode of operation comprises:

in advance of receipt of the user issued capture instruction, execution of one or more pre-processing operations on image sensor data representative of the target scene to provide pre-processed image sensor data; and responsive to receipt of the user issued capture instruction, execution of one or more further processing operations on the pre-processed image sensor data to generate image sensor data representative of the captured target scene.

* * * * *